(12) United States Patent
Zhou et al.

(10) Patent No.: US 12,001,922 B2
(45) Date of Patent: Jun. 4, 2024

(54) QUANTUM CIRCUIT AND QUANTUM PROCESSOR

(71) Applicant: TENCENT TECHNOLOGY (SHENZHEN) COMPANY LIMITED, Shenzhen (CN)

(72) Inventors: Yu Zhou, Shenzhen (CN); Zhenxing Zhang, Shenzhen (CN); Shuoming An, Shenzhen (CN); Zelong Yin, Shenzhen (CN); Sainan Huai, Shenzhen (CN); Xiu Gu, Shenzhen (CN); Xiong Xu, Shenzhen (CN); Shengyu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 194 days.

(21) Appl. No.: 17/668,380

(22) Filed: Feb. 9, 2022

(65) Prior Publication Data
US 2022/0269970 A1 Aug. 25, 2022

Related U.S. Application Data

(63) Continuation of application No. PCT/CN2021/117309, filed on Sep. 8, 2021.

(30) Foreign Application Priority Data

Jan. 27, 2021 (CN) .......................... 202110112980.4

(51) Int. Cl.
*G06N 10/40* (2022.01)
*G06N 10/20* (2022.01)

(52) U.S. Cl.
CPC ............. *G06N 10/40* (2022.01); *G06N 10/20* (2022.01)

(58) Field of Classification Search
CPC ....................................................... G06N 10/40
(Continued)

(56) References Cited

U.S. PATENT DOCUMENTS 8,022,722 B1 9/2011 Pesetski et al.
10,483,980 B2 * 11/2019 Sete ........................ G06N 10/00
(Continued)

FOREIGN PATENT DOCUMENTS

CN 107408223 A 11/2017
CN 110490327 A 11/2019
(Continued)

OTHER PUBLICATIONS

Strand, J.D.; Ware, Matthew; Beaudoin, Felix; Ohki, T.A.; Johnson, B.R.; Blais, Alexandre; Plourde, B.L.T.; "First-order sideband transitions with flux-driven asymmetric transmon qubits;" American Physical Society 2013 (Year: 2013).*

(Continued)

*Primary Examiner* — Eric D Lee
(74) *Attorney, Agent, or Firm* — ANOVA LAW GROUP, PLLC

(57) ABSTRACT

A quantum circuit includes: a qubit, a resonant cavity, and a feeder, the resonant cavity being coupled to the qubit, and the feeder being coupled to the qubit. The feeder is configured to feed an initialization signal to the qubit, the initialization signal being a modulation signal used for causing a frequency of the qubit to generate a vibration. The vibration causes an equivalent state exchange to occur between the qubit and the resonant cavity, and an excited state of the qubit is initialized to a ground state by using the resonant cavity.

20 Claims, 6 Drawing Sheets

(58) Field of Classification Search
USPC .......................................................... 716/119
See application file for complete search history.

(56) References Cited

U.S. PATENT DOCUMENTS

| | | | |
|---|---|---|---|
| 10,540,602 B2* | 1/2020 | Heeres | ................. H03B 5/1847 |
| 2005/0098773 A1 | 5/2005 | Mon et al. | |
| 2019/0007051 A1 | 1/2019 | Sete et al. | |
| 2019/0042969 A1 | 2/2019 | Hogaboam et al. | |
| 2019/0383586 A1 | 12/2019 | Barends | |
| 2019/0392344 A1 | 12/2019 | Kelly | |
| 2020/0125987 A1 | 4/2020 | Bishop et al. | |

FOREIGN PATENT DOCUMENTS

| | | |
|---|---|---|
| CN | 110659739 A | 1/2020 |
| CN | 111222644 A | 6/2020 |
| CN | 111652376 A | 9/2020 |
| CN | 111967603 A | 11/2020 |
| CN | 112232513 A | 1/2021 |
| CN | 113326944 A | 8/2021 |
| JP | 2007516610 A | 6/2007 |
| WO | 2018106222 A1 | 6/2018 |

OTHER PUBLICATIONS

The Japan Patent Office (JPO) Decision to Grant a Patent for Application No. 2022-517154 and Translation May 23, 2023 5 Pages.
M. D. Reed et al., "Fast Reset and Suppressing Spontaneous Emission of a Superconducting Qubit" and arXiv.org [online], arXiv:1003.0142v2, Cornell University, 2010, and pp. 1-4 and [May 15, 2023 The search ] and Internet:<URL:https://arxiv.org/abs/1003.0142v2>.
The State Intellectual Property Office of the People's Republic of China (SIPO) Office Action 1 for for 202110112980.4 dated Dec. 21, 2021 13 Pages (including translation).
The World Intellectual Property Organization (WIPO) International Search Report for PCT/CN2021/117309 dated Dec. 8, 2021 7 Pages (including translation).
J. D. Strand et al., "First-order sideband transitions with flux-driven asymmetric transmon qubits," Physical Review B 87, Dec. 31, 2013 (Dec. 31, 2013). 5 pages.
Yulin Wu et al., "An efficient and compact switch for quantum circuits," npj Quantum Information, Oct. 11, 2018 (Oct. 11, 2018). 8 pages.
P. Magnard et al., "Fast and Unconditional All-Microwave Reset of a Superconducting Qubit," arXiv:1801.07689v1, Jan. 23, 2018 (Jan. 23, 2018). 9 pages.
David P. Divincenzo, "The Physical Implementation of Quantum Computation," arXiv:quant-ph/0002077v3, Apr. 13, 2000. 9 pages.
D. H. Slichter et al., "Measurement-induced qubit state mixing in circuit QED from up-converted dephasing noise," Physical Review Letters 109, 153601, 2012. 5 pages.
Paul Magnard et al., "Fast and unconditional all-microwave reset of a superconducting qubit," Physical review etters 121, 060502, 2018. 12 pages.
Kurtis Geerlings et al., "Demonstrating a driven reset protocol for a superconducting qubit," Physical review letters 110, 120501, 2013. 5 pages.
The European Patent Office (EPO) The Extended European Search Report for 21844599.7 dated Nov. 22, 2022 7 Pages (including translation).
Daniel J Egger et al:"Pulsed reset protocol for fixed-frequency superconducting qubits" , arxiv.org , Cornell University Library,201Olin Library Cornell University Ithaca ,NY14853,Feb. 25, 2018 (Feb. 25, 2018) ,XP081134587, DOI: 10.1103/PHYSREVAPPLIED.10.044030.

* cited by examiner

QUANTUM CIRCUIT AND QUANTUM PROCESSOR

CROSS-REFERENCES TO RELATED APPLICATIONS

This application is a continuation application of PCT Patent Application No. PCT/CN2021/117309, filed on Sep. 8, 2021, which claims priority to Chinese Patent Application No. 202110112980.4, entitled "QUANTUM CIRCUIT AND QUANTUM PROCESSOR" and filed on Jan. 27, 2021, the entire contents of both of which are incorporated herein by reference.

FIELD OF THE TECHNOLOGY

Embodiments of the present disclosure relate to the field of quantum technologies, and in particular, to a quantum circuit and a quantum processor.

BACKGROUND OF THE DISCLOSURE

DiVincenzo proposed five standards (that is, DiVincenzo criteria) in 2000 to implement universal quantum computing, and one of the standards is an ability to initialize a quantum state to a ground state well.

SUMMARY

Embodiments of the present disclosure provide a quantum circuit and a quantum processor, to implement an efficient and high-precision qubit initialization solution. The technical solutions are as follows:

According to an aspect of the embodiments of the present disclosure, a quantum circuit is provided. The quantum circuit includes: a qubit, a resonant cavity, and a feeder, the resonant cavity being coupled to the qubit, and the feeder being coupled to the qubit. The feeder is configured to feed an initialization signal to the qubit, the initialization signal being a modulation signal used for causing a frequency of the qubit to generate a vibration. The vibration causes an equivalent state exchange to occur between the qubit and the resonant cavity, and an excited state of the qubit is initialized to a ground state by using the resonant cavity.

According to another aspect of the embodiments of the present disclosure, a quantum processor is provided. The quantum processor includes the foregoing quantum circuit.

According to another aspect of the embodiments of the present disclosure, a quantum computer is provided. The quantum computer includes the foregoing quantum circuit.

According to another aspect of the embodiments of the present disclosure, a method implemented by a quantum circuit is provided. The quantum circuit includes: a qubit, a resonant cavity, and a feeder, the resonant cavity being coupled to the qubit, and the feeder being coupled to the qubit. The method includes feeding, by the feeder, an initialization signal to the qubit, the initialization signal being a modulation signal used for causing a frequency of the qubit to generate a vibration; and causing, by the vibration, an equivalent state exchange to occur between the qubit and the resonant cavity, and initializing, by using the resonant cavity, an excited state of the qubit to a ground state.

The technical solutions provided in the embodiments of the present disclosure may bring the following beneficial effects:

The present disclosure provides an efficient and high-precision qubit initialization solution. In the technical solutions of the present disclosure, a modulation signal is applied to a qubit as an initialization signal, so that an excited state of the qubit quickly decays to a ground state by using a resonant cavity, thereby implementing rapid and high-fidelity initialization. In addition, in such a solution, a feedback loop does not need to be introduced to measure and read a state of the qubit, thereby reducing requirements for hardware.

BRIEF DESCRIPTION OF THE DRAWINGS

To describe technical solutions in embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other accompanying drawings from these accompanying drawings without creative efforts.

DESCRIPTION OF EMBODIMENTS

Figure 1:
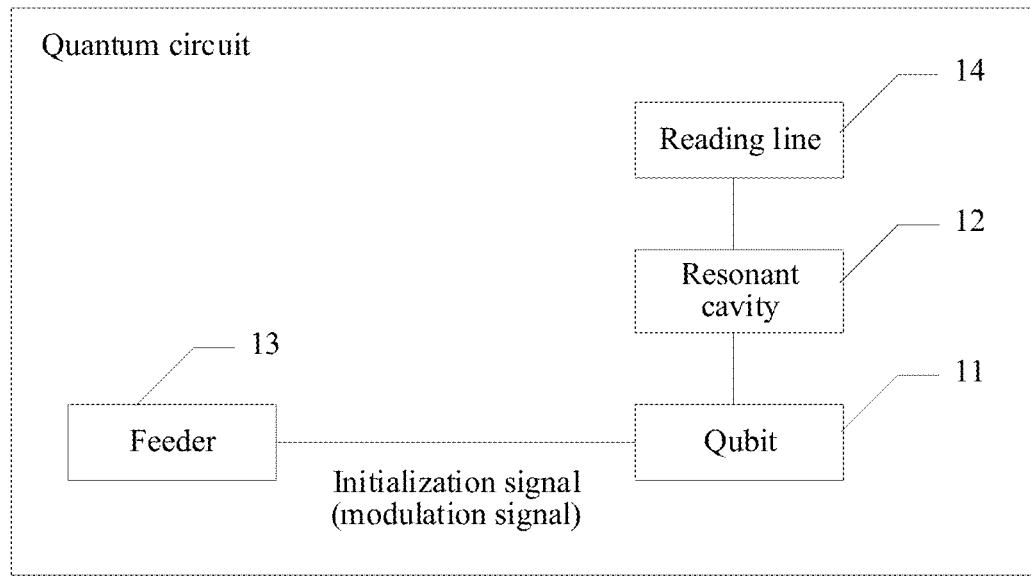
FIG. 1 is a schematic diagram of a quantum circuit according to an embodiment of the present disclosure.

To make objectives, technical solutions, and advantages of the present disclosure clearer, the following further describes implementations of the present disclosure in detail with reference to the accompanying drawings.

A quantum computer is a machine that performs calculations through the principle of quantum mechanics. Based on the superposition principle of quantum mechanics and quantum entanglement, the quantum computer has relatively strong parallel processing capabilities and can resolve some problems that are difficult for a classical computer to calculate. The zero resistance characteristic of superconducting qubits and a manufacturing process close to that of integrated circuits make a quantum computing system constructed by using superconducting qubits one of the most promising systems currently for implementing practical quantum computing.

A quantum processor refers to a quantum-level computer processor, that is, a processor of a quantum computer. The quantum processor includes one or more quantum chips.

The quantum chip (or referred to as a quantum circuit) is a central processing unit of a quantum computer, and is a core component in the quantum computer. The quantum chip is to integrate quantum circuits on a substrate to further carry a function of quantum information processing. With reference to the development history of conventional computers, to achieve commercialization and industrial upgrading, the quantum computer research needs to take the path of integration after overcoming a bottleneck problem. Superconducting systems, semiconductor quantum dot systems, micro-nano photonics systems, and even atomic and ionic systems all want to move onto chips. In terms of development, superconducting quantum chip systems are technologically ahead of other physical systems. Conventional semiconductor quantum dot systems are also a goal that people put effort into exploring, since the development of the conventional semiconductor industry is already very mature after all. For example, once semiconductor quantum chips break through a threshold of fault-tolerant quantum computing in terms of decoherence time and manipulation accuracy, it is expected that the existing achievements of the conventional semiconductor industry will be integrated to save development costs.

In view of the advantages of quantum computers, quantum computers can be used for some processing and calculations in the future. For example, quantum computers can be used for some processing and calculations in systems built based on cloud technologies, to provide better services.

Different from a case that such conventional classical physical quantities as a low level and a high level represent 0 and 1, in quantum computing, physical quantities such as the spin of an electron and the polarization of light are used as a state 0 and a state 1 of a qubit. The mightiness of quantum computing lies in the use of the superposition of quantum states in coordination with quantum algorithms for parallel computing or simulation. Superconducting quantum computing is to construct equivalent energy levels by using Josephson junctions (a device with a Josephson effect with a superconductor-insulator-superconductor structure, which is a key part of constructing superconducting qubits). A ground state in the constructed energy levels is equivalent to 0, and a first excited state is equivalent to 1. Without performing any operation, an ideal quantum system is 100% in a state 0. However, because the temperature is still in the order of tens of mK (millikelvin degrees), a small amount of thermal excitation is caused, and there are still some residual states 1. The residual states 1 follow the Maxwell-Boltzmann distribution:

$$P_{(i)} = g_i \frac{1}{Q} e^{-\frac{E_i}{k_B T}}$$

$P_{(i)}$ represents a probability that a qubit i is in a state 1, i is labels of different qubits, $$Q = \sum_i g_i e^{-\frac{E_i}{k_B T}},$$

T is a system temperature, $k_B$ is a Boltzmann constant, $g_i$ is an energy level degeneracy, $E_i$ is an energy level gap, and e is a natural constant. Using a qubit with a frequency of 5.8 GHz (gigahertz) and an equivalent temperature of 80 mK as an example, a calculated probability that the qubit is in a state 1 (that is, the residual thermal excitation) is 2.8%. This residual thermal excitation directly affects a read fidelity and the fidelity of an entire calculation process. Fidelity is a value describing how close an actual measured value is to an ideal value in a quantum system. Therefore, how to quickly initialize a state 1 caused by the residual thermal excitation to a state 0 and improve the fidelity of initialization to enable the entire system to be initialized with high efficiency and high precision is a very important issue.

In a feedback-based initialization solution provided by the related art, on the one hand, it is necessary to perform measurement and read whether a qubit is in a state 0 or a state 1, and in a measurement and reading process, a state of the qubit is affected. For example, the state of the qubit is originally just the superposition of the state 0 and the state 1, and due to impact of the measurement and reading, mixing of states is caused such as introducing a state in another subspace and causing a state leakage, which results in relatively low reading fidelity. Furthermore, a π pulse applied to the qubit is also limited by precision. As a result, relatively low initialization precision is caused in general. On the other hand, due to the introduction of a feedback loop for measurement and reading of the state of the qubit, requirements for hardware are also relatively high.

The present disclosure provides an efficient and high-precision qubit initialization solution. Qubit initialization is to prepare a qubit into a known quantum state such as a state 0 of the qubit. In the technical solutions of the present disclosure, a state of a qubit does not need to be measured or read. A modulation signal is applied on the qubit as an initialization signal to modulate a magnetic flux of the qubit, so that an excited state (such as state 1) of the qubit quickly decays to a ground state (that is, state 0) by using a resonant cavity, thereby implementing rapid and high-fidelity initialization. In addition, in such a solution, a feedback loop does not need to be introduced to measure and read the state of the qubit, thereby reducing requirements for hardware. The technical solutions of the present disclosure are described in detail below by using a plurality of embodiments.

FIG. 1 is a schematic diagram of a quantum circuit according to an embodiment of the present disclosure. The quantum circuit includes a qubit 11, a resonant cavity 12, and a feeder 13.

In this embodiment of the present disclosure, the qubit 11 is a frequency-adjustable qubit. That is, the frequency of the qubit is adjustable. The frequency of the qubit is adjusted by applying a specific signal to the qubit. For example, the qubit 11 is a frequency-adjustable superconducting qubit.

In addition, the qubit 11 is any type of qubit with adjustable frequency, for example, a Transmon qubit. Transmon is a type of superconducting qubit, which is characterized in that a large capacitor is connected in parallel to reduce the impact of charge noise on the qubit, and the frequency is adjustable. In some other examples, the qubit 11 is another type of qubit with adjustable frequency, for example, a flux qubit, a charge qubit, or a phase qubit. This is not limited in the embodiments of the present disclosure.

As shown in FIG. 1, the quantum circuit further includes a reading line 14. The resonant cavity 12 is coupled to the reading line 14, and the resonant cavity 12 is further coupled to the qubit 11. For example, the resonant cavity 12 and the reading line 14 are inductively coupled to each other, and the resonant cavity 12 and the qubit 11 are capacitively coupled to each other. Optionally, a coupling strength between the resonant cavity 12 and the qubit 11 is approximately 100 MHz. The reading line 14 and the resonant cavity 12 are configured to read a state of the qubit 11. Specifically, when the qubit 11 is in different states, the frequency of the resonant cavity 12 presents different characteristics. The reading line 14 can learn the state of the qubit 11 by reading the frequency of the resonant cavity 12. The reading line 14 and the resonant cavity 12 described herein are configured to measure and read the state of the qubit 11 in a process of quantum computing. However, in a process of initializing the qubit 11 in the present disclosure, the state of the qubit 11 does not need to be measured or read. Regardless of which state the qubit 11 is in, an initialization signal in the present disclosure is directly applied to the qubit 11.

As shown in FIG. 1, the quantum circuit provided in this embodiment of the present disclosure further includes the feeder 13 coupled to the qubit 11. The feeder 13 is configured to feed an initialization signal to the qubit 11. The initialization signal is a modulation signal such as a modulation pulse signal (briefly referred to as a "modulation pulse") used for causing the frequency of the qubit 11 to generate a vibration. Further, the vibration causes an equivalent state exchange to occur between the qubit 11 and the resonant cavity 12, so that an excited state of the qubit 11 is initialized to a ground state by using the resonant cavity 12.

A coupling part of the qubit 11 and the reading line 14 and a coupling part of the feeder 13 and the qubit 11 are not limited to shapes shown in FIG. 1.

Optionally, when an energy level of a sideband generated by the vibration and an energy level of the resonant cavity 12 meet an approach condition, an equivalent state exchange occurs between the qubit 11 and the resonant cavity 12. The resonant cavity 12 is equivalent to a cold store. Because a decay coefficient of the resonant cavity 12 is high, the resonant cavity 12 can quickly decay the excited state of the qubit 11, so as to initialize the qubit 11 to the ground state, that is, quickly initialize the qubit 11 from a state 1 to a state 0. Because a photon in the resonant cavity 12 has a decay rate that is high and a decay time that is approximately 30 to 80 ns, the resonant cavity is relatively suitably used as a channel for rapidly decaying the energy of the qubit 11, to quickly decay the qubit 11 from the excited state to the ground state.

Optionally, the approach condition means that the energy level of the sideband is equal to the energy level of the resonant cavity 12, or a difference between the energy level of the sideband and the energy level of the resonant cavity 12 is less than a first threshold, the first threshold being a preset value, or a difference between an energy level corresponding to a modulation frequency of the initialization signal and 1/N of an energy level difference is less than a second threshold, where the energy level difference refers to a difference between the energy level of the sideband and the energy level of the resonant cavity 12, and N is a value such as 2, 3, or 4. This is not limited in the embodiments of the present disclosure.

Figure 2:
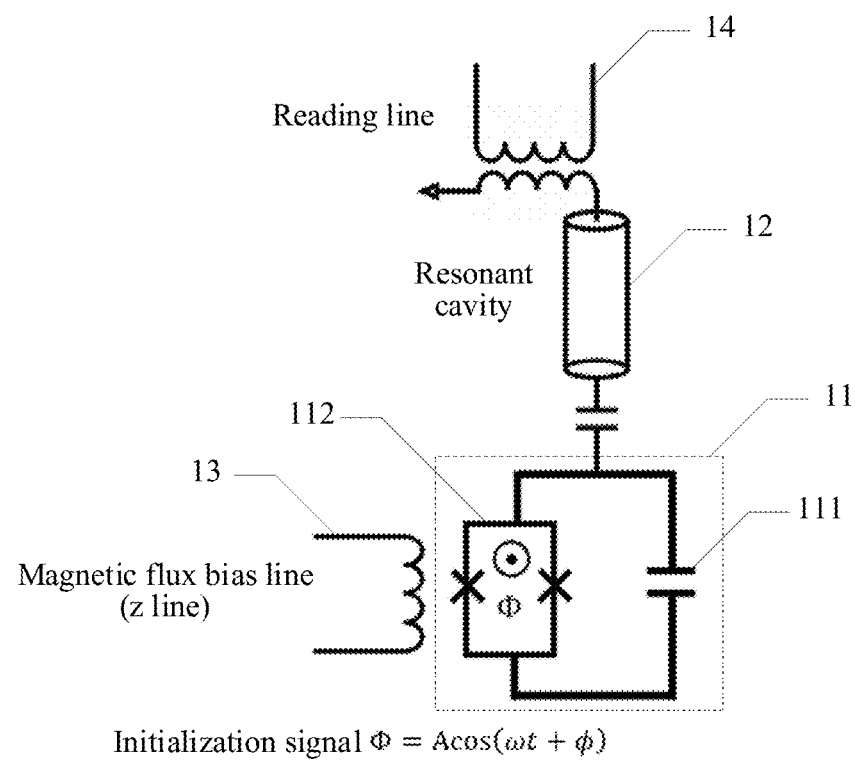
FIG. 2 is a schematic diagram of an equivalent circuit corresponding to the quantum circuit in FIG. 1.

FIG. 2 is a schematic diagram of an equivalent circuit corresponding to the quantum circuit in FIG. 1. In the equivalent circuit shown in FIG. 2, the equivalent circuit of the qubit 11 includes a coupling capacitor 111 and a superconducting quantum interference device (SQUID) 112 including two Josephson junctions. The resonant cavity 12 and the qubit 11 are capacitively coupled, and the resonant cavity 12 and the reading line 14 are inductively coupled. Optionally, the feeder 13 is a magnetic flux bias line, which can generate magnetic flux in a double-junction region of the SQUID 112 to adjust the frequency and an energy level of the qubit 11. The magnetic flux bias line may also be referred to as a z line. A coupling manner between the feeder 13 (such as a magnetic flux bias line) and the qubit 11 is not limited in this embodiment of the present disclosure. For example, an inductive coupling is adopted between the feeder 13 and the qubit 11.

Figure 3:
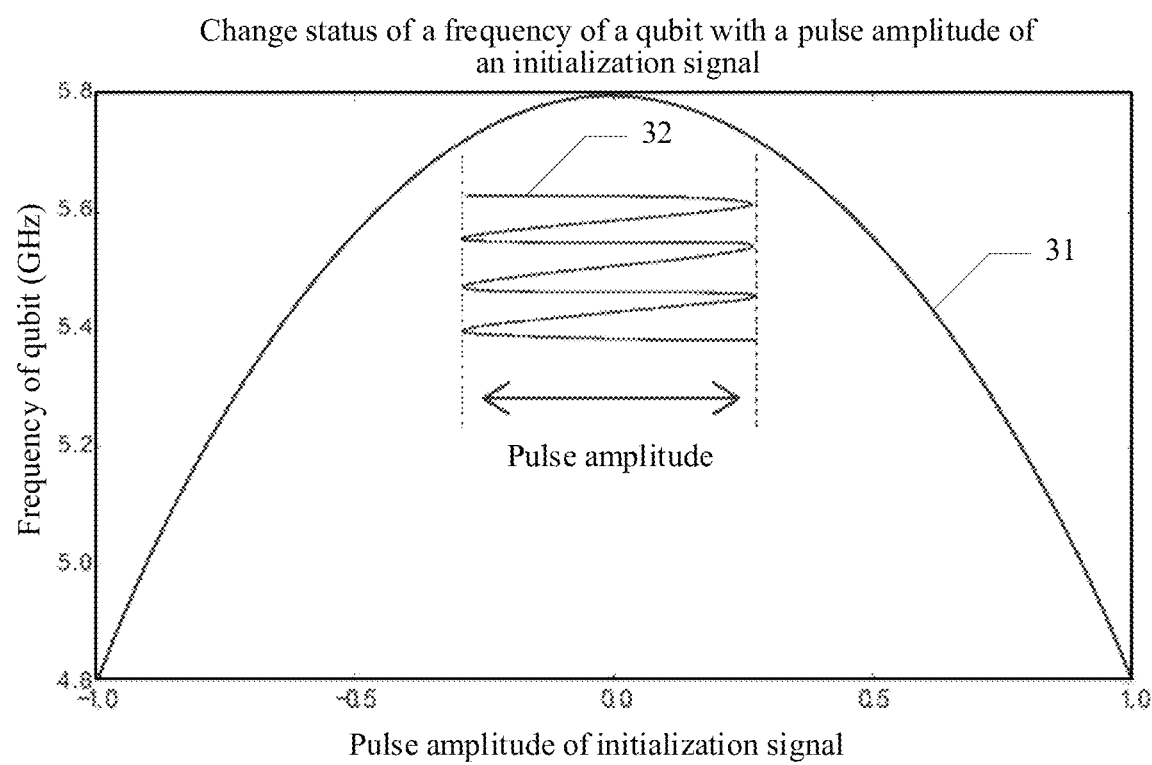
FIG. 3 is a schematic diagram of a change status of a frequency of a qubit with a pulse amplitude of an initialization signal.

As shown in FIG. 3, a line 31 represents a change status of the frequency of the qubit with a pulse amplitude of the initialization signal. If a modulation pulse shown by a line 32 in FIG. 3 is applied to the z line in FIG. 2, the frequency of the qubit generates a vibration near a sweet spot (which is an optimal operating point) and the vibration generates a sideband with a frequency of $\omega_q+\omega$, where $\omega_q$ represents the frequency of the qubit, and $\omega$ represents a modulation frequency of the initialization signal (that is, the foregoing modulation pulse). When the frequency or an energy level of the sideband approaches a frequency or an energy level of the resonant cavity, a population of states 1 of the qubit transfers to the resonant cavity. The resonant cavity is equivalent to a cold store, which quickly initializes an excited state of the qubit to a ground state, that is, quickly initializes the qubit from the state 1 to the state 0. This is because a case that the energy level of the sideband approaches the energy level of the resonant cavity is equivalent to a case that a quantum state exchange occurs between the qubit and the resonant cavity. However, due to quite fast decay in the resonant cavity, the states 1 of the qubit are quickly leaked, that is, an initialization process is implemented.

Optionally, the initialization signal is determined according to a product of a modulation amplitude of the initialization signal and a trigonometric function, variables of the trigonometric function including a modulation frequency of the initialization signal, a modulation phase of the initialization signal, and time. For example, the initialization signal can be represented by:

$$\Phi = A\cos(\omega t + \phi)$$

$\Phi$ represents the initialization signal, A represents a modulation amplitude of the initialization signal, $\omega$ represents a modulation frequency of the initialization signal, $\phi$ represents a modulation phase of the initialization signal, and t represents time. The initialization signal is generated by any waveform generator. As long as such three parameters as A, $\omega$, and $\phi$ are provided to the waveform generator, a modulation signal that meets requirements of the parameters can be generated by using the waveform generator.

In the qubit initialization solution provided by this embodiment of the present disclosure, only a waveform generator needs to be added to generate the initialization signal. Both the magnetic flux bias line and the resonant cavity used in the initialization process are components originally required by the quantum circuit, and there is no need to add another resonant cavity or control line. Therefore, requirements for hardware are quite low.

In an exemplary embodiment, when the operating point of the qubit is close to the sweet spot, a modulation order of the initialization signal is an even number greater than or equal to 2. When the operating point of the qubit is far away from the sweet spot, the modulation order of the initialization signal is an integer greater than or equal to 1. The operating point of the qubit refers to a frequency of the qubit in an initialization state. The sweet spot of the qubit may also be referred to as a center point, an optimal operating point, or another name, which indicates a frequency position at which the qubit is not sensitive to noise, and the coherence of the qubit is relatively good. The operating point of the qubit is determined through artificial selection. For example, the operating point of the qubit is selected near the sweet spot, so that the operating point is close to the sweet spot. Alternatively, the operating point of the qubit is selected far away from the sweet spot. In an optional embodiment of the present disclosure, "close" and "far away from" described above are distinguished by using a threshold. For example, when a frequency difference between the operating point of the qubit and the sweet spot of the qubit is less than the threshold, it is determined that the operating point is close to the sweet spot; and when the frequency difference between the operating point of the qubit and the sweet spot of the qubit is greater than the threshold, it is determined that the operating point is far away from the sweet spot. The threshold is set according to an actual situation, and is not limited in the present disclosure.

In addition, the foregoing conclusion of determining the modulation order can be obtained through actual experiments or simulation experiments. Through experiments, an initialization signal is applied to a qubit, a modulation frequency and a modulation order of the initialization signal are adjusted, and a probability that the qubit is in a state 1 is then measured. It is found that if an operating point of the qubit is close to a sweet spot, an initialization effect achieved by using second-order modulation, fourth-order modulation, or higher-even-number-order modulation is better (that is, the probability that the qubit is in the state 1 is lower). When the operating point of the qubit is far away from the sweet spot, a better initialization effect can be achieved by using first-order modulation, second-order modulation, or higher-order modulation. In addition, a modulation signal with an order that is used can also be obtained through the above experiment, and a purpose is to make the probability that the qubit is in the state 1 as low as possible.

Optionally, the modulation frequency of the initialization signal is approximately one $N^{th}$ of a difference between the frequency of the qubit and the frequency of the resonant cavity, and N is the modulation order of the initialization signal. That is, after the modulation order N of the initialization signal is determined, the modulation frequency of the initialization signal is further determined with reference to the modulation order N and the foregoing frequency difference. In some embodiments, the modulation frequency of the initialization signal is determined according to a frequency difference between the qubit and the resonant cavity, a modulation order of the initialization signal, and an allowable deviation range. For example, the modulation frequency of the initialization signal is represented by:

$$\omega = \frac{\delta}{N} + \alpha$$

where $\omega$ represents the modulation frequency of the initialization signal, $\delta$ is the frequency difference between the qubit and the resonant cavity (that is, the difference between the frequency of the qubit and the frequency of the resonant cavity), N is the modulation order of the initialization signal, and $\alpha$ is an allowable deviation range. For example, $\alpha$ is a value and represents an allowable deviation value, or $\alpha$ is a value range, the value range of $\alpha$ can be determined through the foregoing formula, and any value within the value range can be used as the modulation frequency of the initialization signal. The allowable deviation range is determined with reference to experiments or actual experience, and this is not limited in the present disclosure.

The initialization solution provided by the present disclosure is implemented by using a coupling interaction between the resonant cavity and the qubit. A system Hamiltonian $\mathcal{H}_{total}$ is written as a sum of a basic Hamiltonian $\mathcal{H}_0$ and an interaction Hamiltonian $\mathcal{H}_{int}$, namely:

$$\frac{\mathcal{H}_0}{\hbar} = \omega_1 a^\dagger a + \frac{\eta}{2}(a^+ aa^+ a - a^+ a) + \omega_r b^+ b$$

$$\frac{\mathcal{H}_{int}}{\hbar} = -g(a - a^+)(b - b^*)$$

$$\mathcal{H}_{total} = \mathcal{H}_0 + \mathcal{H}_{int}$$

where $\omega_q$ is the frequency of the qubit, $\eta$ is an anharmonicity constant of the qubit, and $a^+$, $a$ and $b^+$, $b$ are ladder operators of the qubit and the resonant cavity respectively, and g is a coupling strength (about 100 MHz) between the qubit and the resonant cavity. For example, $\omega_q$ of the qubit and magnetic flux added to the z line in FIG. 3 are simplified as:

$$\hbar\omega_q = \sqrt{8E_c E_j \sqrt{1 + d^2 \tan^2\left(\frac{\pi\Phi}{\Phi_0}\right)} \left|\cos\left(\frac{\pi\Phi}{\Phi_0}\right)\right|} - E_c$$

where $E_c$ is the electrostatic energy of the qubit, $E_j$ is the energy of the SQUID, d is related to the symmetry of the two junctions, and $\Phi_0$ is a magnetic flux quantum. The parameters are all fixed values after a qubit is given. When the initialization signal $\Phi$ vibrates in the form of $\Phi = A\cos(\omega t + \phi)$, A is the modulation amplitude, $\omega$ is the modulation frequency, $\phi$ is the modulation phase, and t is time. A caused change of the frequency $\omega_q$ of the qubit is substituted into an overall Hamiltonian $\mathcal{H}_{total}$ of a system, and by simulating a time-dependent Hamiltonian in a Lindblad master equation (both the qubit and resonant cavity are intercepted to three energy levels) and preparing the qubit in the state 1 by using a $\pi$ pulse, a simulation result shown on the right side of FIG. 4 can be obtained. Similar to measured data obtained from an actual experimental result shown on the left side of FIG. 4, color depth in the figure represents a residual quantity of states 1, and a color closer to black indicates a better initialization effect.

A derivation process is as follows: The overall Hamiltonian of the system is:

$$H_{total} = \omega_q a^\dagger a + a + \frac{\eta}{2} a^\dagger a^\dagger aa + \omega_r b^\dagger b + g(b^\dagger a + ba^\dagger)$$

After rotating wave approximation is performed by using the frequency of the qubit and the frequency of the resonant cavity as reference frames, the following formula can be obtained:

$$H_{total} = \frac{\eta}{2} a^\dagger a^\dagger aa + g(e^{i\delta t} b^\dagger a + e^{-i\delta t} ba^\dagger)$$

where $\delta$ is the frequency difference between the qubit and the resonant cavity, and the frequency of the qubit is simplified as:

$$\omega_q = \omega_{q0} + A\cos \Delta t$$

where $\omega_{q0}$ is a center point frequency of a vibration, $\Delta$ is the modulation frequency of the initialization signal (which is equivalent to $\omega$ in the foregoing formula $\Phi = A\cos(\omega t + \phi)$), and t is time.

Then, $$H_{total} = \frac{\eta}{2}a^\dagger a^\dagger aa + g\, e^{i\omega_{q0}t - i\omega_r t + iA\int_0^t \cos\Delta x dx} b^\dagger a + h.c.$$

$$= \frac{\eta}{2}a^\dagger a^\dagger aa + g e^{i\delta t + \frac{iA}{\Delta}\sin\Delta t} b^\dagger a + h.c.$$

expansion is performed according to Bessel orders:

$$e^{-\delta t + \frac{iA}{\Delta}\sin\Delta t} = J_0\left(\frac{A}{\Delta}\right)e^{i\delta t} + \sum_{n=1}^{\infty} J_n\left(\frac{A}{\Delta}\right)e^{in\Delta t + i\delta t} + J_n\left(\frac{A}{\Delta}\right)e^{-in\Delta t + i\delta t + in\pi}$$

Therefore, when $n\Delta + \delta = 0$ or $n\Delta - \delta = 0$, an equivalent resonance interaction occurs:

$$\widetilde{g_n} = \left(\frac{A}{\Delta}\right)g$$

$J_n$ is an $n^{th}$ Bessel order coefficient, $\widetilde{g_n}$ is equivalent to an equivalent coupling strength, and n is a modulation order. This is the reason for occurrence of different stripe shapes in FIG. 4. In addition, if the operating point of the qubit is near the sweet spot, because the modulation thereof is symmetrical and there is no direct current component, the modulation order n in the above formula can only be an even number, and the modulation order is 2, 4, 6, or the like. If the operating point of the qubit is not near the sweet spot, because the modulation thereof is asymmetrical and there is a direct current component, the modulation order n in the above formula may be any positive integer. For example, the modulation order is 1, 2, 3, 4, or the like.

Figure 4:
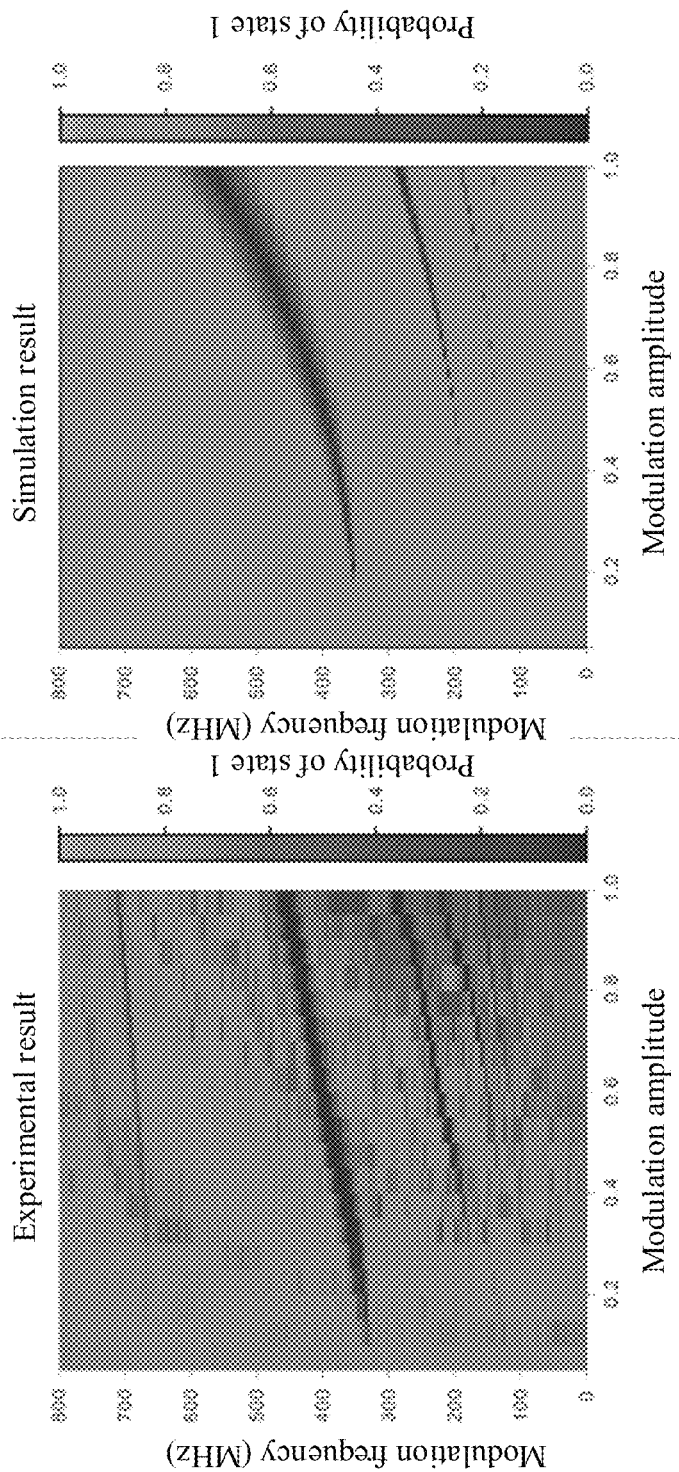
FIG. 4 is a comparison diagram of probabilities of a state 1 that are obtained from an experimental result of magnetic flux modulation and a simulation result.

It can be seen from FIG. 4 that the experimental result is basically consistent with the simulation result. In addition, it can also be verified that the solution of the present disclosure is feasible in principle. Under frequency modulation, the population of the qubit in the state 1 can be rapidly decayed by using the resonant cavity.

Based on the above, the present disclosure provides an efficient and high-precision qubit initialization solution. In the technical solutions of the present disclosure, a modulation signal is applied to a qubit as an initialization signal, so that an excited state of the qubit quickly decays to a ground state by using a resonant cavity, thereby implementing rapid and high-fidelity initialization. In addition, in such a solution, a feedback loop does not need to be introduced to measure and read the state of the qubit, thereby reducing requirements for hardware.

When the quantum circuit includes a plurality of qubits (that is, is a multi-bit system), because each qubit corresponds to a feeder (for example, a magnetic flux bias line), corresponding initialization signals are respectively applied to the qubits to simultaneously initialize the plurality of qubits. Further, parameters such as a modulation frequency, a modulation amplitude, and a modulation phase of the corresponding initialization signal applied to each qubit may be set specifically according to characteristics of the each qubit. That is, initialization signals with different parameters are applied to different qubits, so that each qubit achieves a better initialization effect.

In addition, regardless of whether the quantum circuit includes a single qubit or a plurality of qubits, in the initialization solution provided by the present disclosure, a state of each qubit does not need to be measured or read to further decide whether to apply an initialization signal to the qubit based on the state. In the initialization solution provided by the present disclosure, regardless of which state the qubit is in, the corresponding initialization signal can be directly applied. A state of a qubit originally in a ground state does not change, an equivalent state exchange occurs between a qubit originally in an excited state and a resonant cavity, and the resonant cavity initializes the qubit from the excited state to a ground state, thereby initializing all qubits to a ground state.

Figure 5:
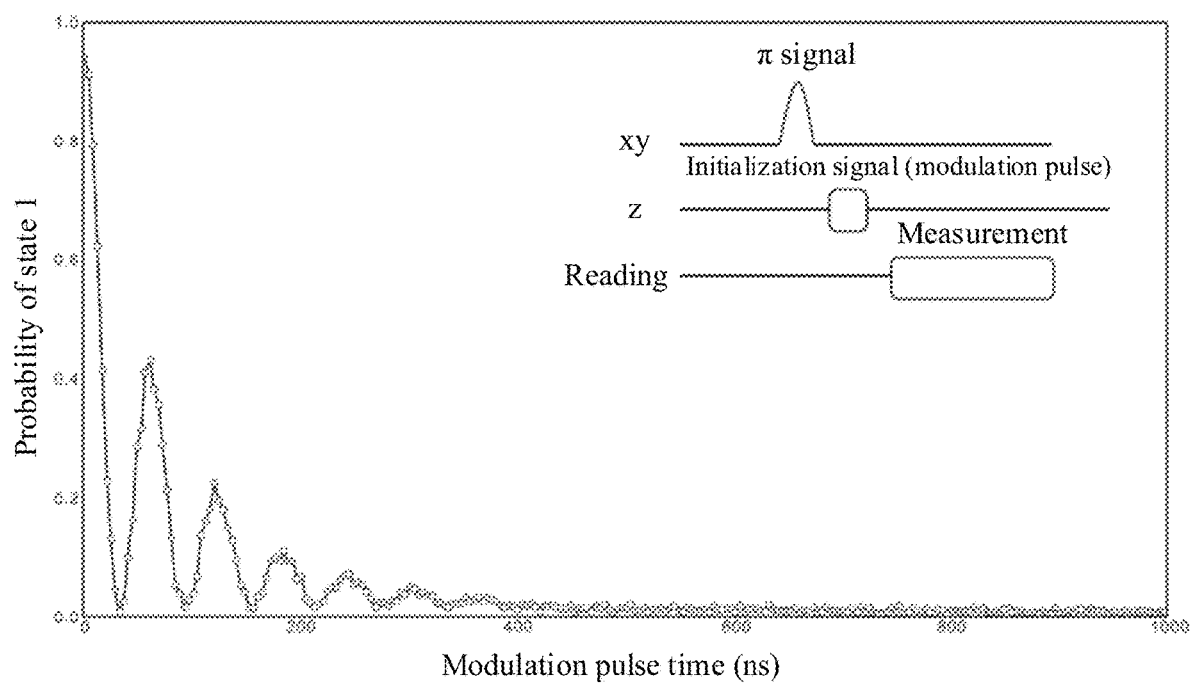
FIG. 5 is a schematic diagram of evolution of a probability of a state 1 with time at a given modulation frequency and amplitude.

FIG. 5 shows a group of experimental data, which shows a relationship in which the probability that the qubit is in the state 1 evolves with the time of the initialization signal (that is, the modulation pulse) with a given modulation frequency and a given modulation amplitude. A pulse sequence is as follows: First, a π pulse is added to an xy line of the qubit to excite the qubit to the state 1, the initialization signal (for example, a modulation pulse with a fixed amplitude and a variable length) in the present disclosure is then added to a z line, and finally, the state of the qubit is read. It can be learned from FIG. 5 that after a modulation pulse of approximately 500 ns, the population of the qubit in the state 1 is basically 0, that is, the qubit is basically in a state 0. In addition, it can be learned from FIG. 5 that the probability that the qubit is in the state 1 presents a decreasing trend of a vibration with the length of the modulation pulse. The source of the vibration thereof is an underdamping phenomenon formed by a strong coupling between the qubit and the resonant cavity. After measurement at the first valley bottom (about 31 ns), residual states 1 drop to below 0.2%, completing high-quality initialization. A qubit, which originally consumes about 10 microseconds to decay, decays to a ground state in the order of hundreds of nanoseconds, and an initialization time is shortened by two orders of magnitude. Through measurement, if residual states 1 caused by thermal excitation occupy about 4% when a system is in an equilibrium state, the residual states 1 can be reduced to below 0.2% through the solution.

Figure 6:
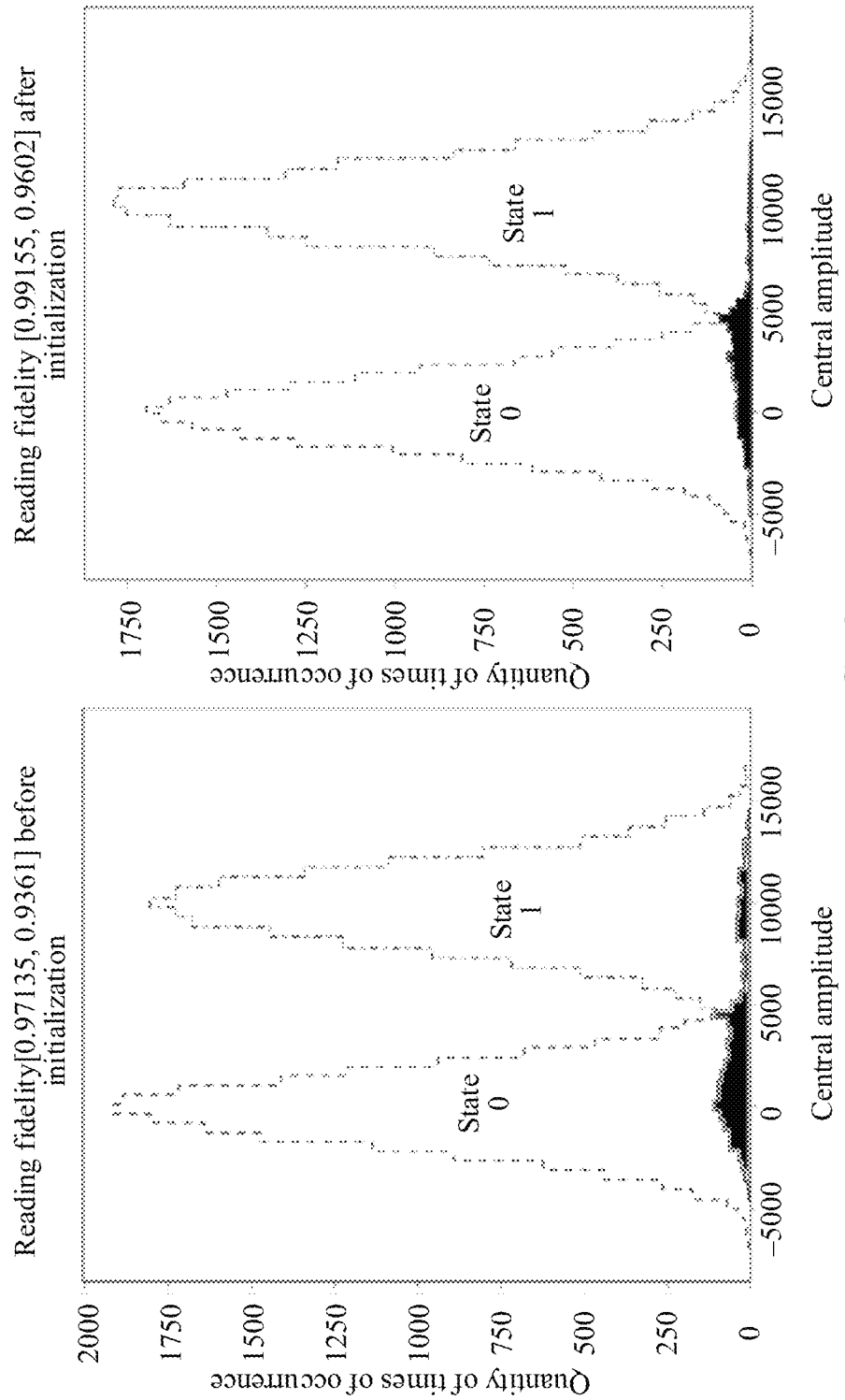
FIG. 6 is a comparison diagram of reading fidelities before initialization and after initialization.

Through the initialization solution provided by the present disclosure, a state 1 originally caused by thermal excitation can be initialized to a state 0. As shown on the left side of FIG. 6, there are also some qubits originally belonging to a state 0 distributed in a state 1 region, and such a distribution affects the reading fidelity of qubits. As shown on the right side of FIG. 6, after the initialization signal in the present disclosure is applied, the distribution of the qubits originally belonging to the state 0 in the state 1 region is significantly reduced. In terms of fidelity, the reading fidelity of the state 0 is increased from 97.135% to 99.155%, and an error rate is reduced by 71%; and the reading fidelity of the state 1 is increased from 93.61% to 96.02%, and an error rate is reduced by 46%.

Figure 7:
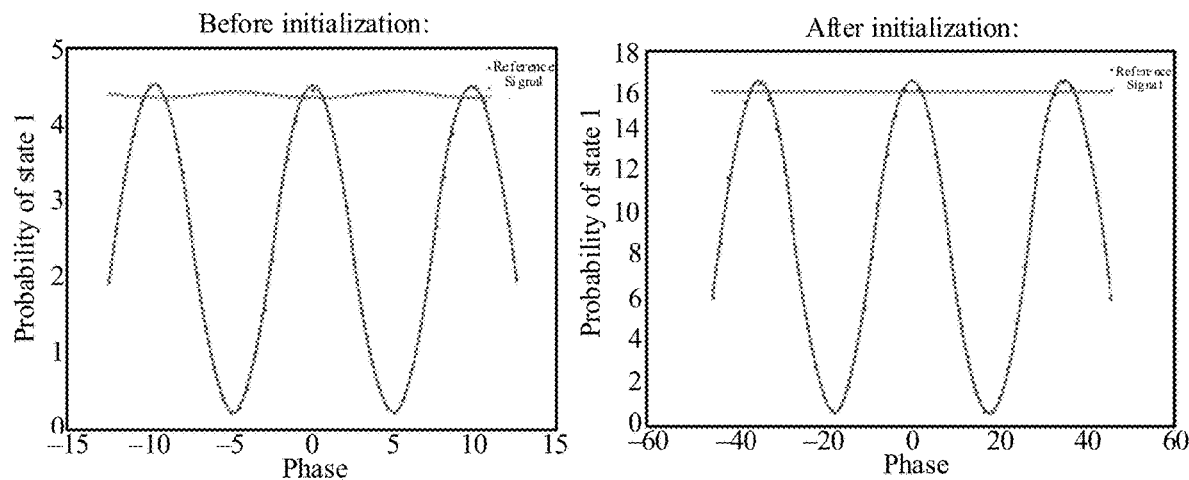
FIG. 7 is a comparison diagram of residual state 1 ratios before initialization and after initialization.

For a proportion of the residual states 1, a state 2 may be introduced and used for measurement. The related art herein may be implemented with reference to a document "Demonstrating a Driven Reset Protocol for a Superconducting Qubit" published by K. Geerlings et al., and details are not described in the present disclosure. As shown on the left side of FIG. 7, if no initialization operation is performed, the residual states 1 caused by thermal excitation are 2.8%. However, as shown on the right side of FIG. 7, the residual states 1 after initialization are less than 0.2%.

Figure 8:
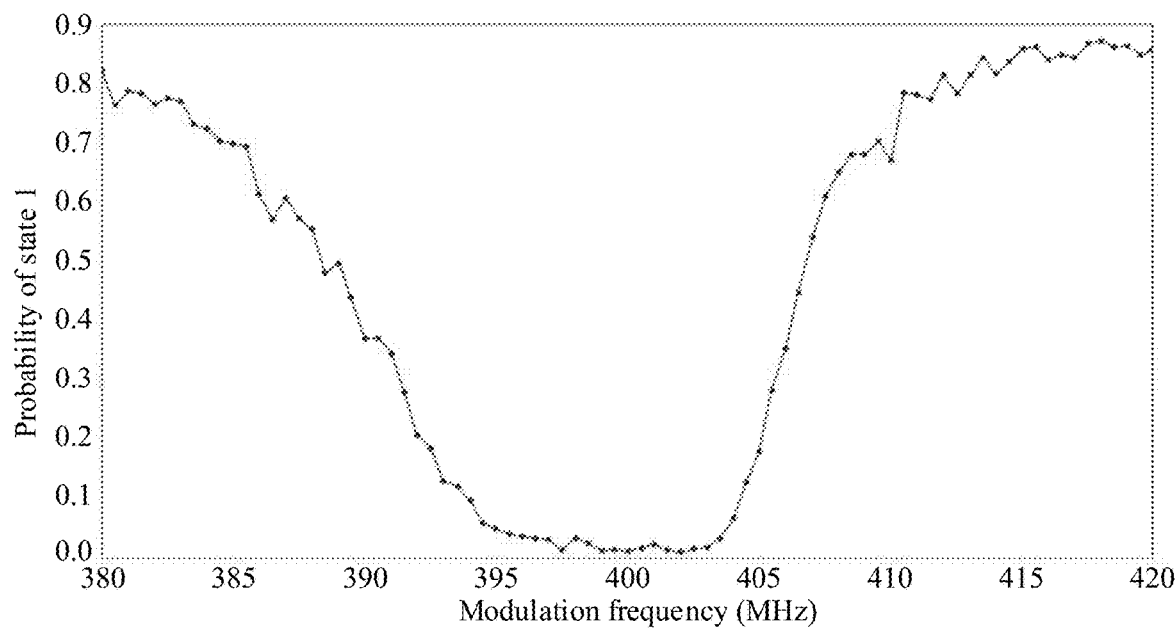
FIG. 8 is a schematic diagram of probabilities of a state 1 that are obtained when modulation frequencies are scanned at a fixed modulation time.

It can be seen from FIG. 8 that if modulation frequencies are scanned in a fixed modulation time, a good initialization effect can be achieved in a relatively large frequency range (395 MHz to 403 MHz), which indicates that in the initialization solution provided by the present disclosure, there is a quite large surplus in parameter selection, and the robustness of the solution is high.

Therefore, in general, the initialization solution provided by the present disclosure has the following beneficial effects:

(1) The initialization solution provided by the present disclosure is essentially to generate a sideband close to a resonant cavity through the modulation of a frequency of a qubit, and to achieve an initialization effect by using the characteristic of rapid decay of the resonant cavity. The resonant cavity is equivalent to an iceberg. Any excited state (state 1) interacting with the resonant cavity is rapidly cooled to a ground state (state 0). Therefore, through the initialization solution, the qubit can be quickly initialized so that a next calculation can be performed, thereby greatly shortening the time for a single calculation. A frequency of completing a calculation per unit time is increased from 2 kHz to 100 kHz.

The technical solutions of the present disclosure are applicable to a calculation process of any frequency-adjustable qubit. A quantum calculation process is divided into: calculation starting, performing a gate operation (the calculation process lasts for about several μs), and calculation ending. From a state in which one calculation ends to a state in which the next calculation starts, it is necessary to wait for a quantum system to return to an initial moment. If the waiting relies on the decay of the qubit itself, a waiting time of 100 μs is generally needed, which means that the next calculation can be performed probably only after a waiting time of 100 μs. If the initialization solution provided by the present disclosure is used, the qubit can be initialized in the order of hundreds of nanoseconds to a state in which the next calculation can be performed. In this way, the overall efficiency is greatly improved, and a quantity of times of calculations completed per unit time is increased from original 2 k times per second to 100 k times per second.

(2) The technical solutions of the present disclosure can be used for reducing a state error caused by thermal excitation, and initializing a state 1 caused by the thermal excitation to a state 0, thereby improving the reading fidelity. Further, because the reading fidelity is improved, a quantity of times required to obtain the same quality of reading can be reduced, thereby reducing a quantity of repetitions and improving efficiency.

(3) The technical solutions of the present disclosure are compatible with an existing frequency-adjustable chip system. A modulation pulse is added to a z line to initialize the qubit with high fidelity in the order of hundreds of nanoseconds. Therefore, the initialization speed and quality are both superior to those of previous solutions.

(4) Through experiments, it is found that the technical solutions of the present disclosure have no visible impact on the frequency and other parameters of adjacent qubits, and are suitable for simultaneous initialization of a multi-bit system.

Based on the above technical points, the present disclosure provides a technical solution for quickly initializing a superconducting qubit. The solution has high operability, an initialization speed in the order of hundreds of nanoseconds, and an effect of residual states 1 less than 0.2%, which can be applied to simultaneous initialization of a multi-bit system, and can improve the reading fidelity and greatly shorten the time required for a single calculation, thereby improving calculation efficiency.

An exemplary embodiment of the present disclosure further provides a quantum processor. The quantum processor includes the quantum circuit described in the foregoing embodiments.

An exemplary embodiment of the present disclosure further provides a quantum computer. The quantum computer includes the quantum circuit described in the foregoing embodiments.

It is to be understood that "plurality of" mentioned in the specification means two or more.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A quantum circuit, comprising: a qubit, a resonant cavity, and a feeder, the resonant cavity being coupled to the qubit, and the feeder being coupled to the qubit, wherein:
   the feeder is configured to feed an initialization signal to the qubit, the initialization signal being a modulation signal used for causing a frequency of the qubit to generate a vibration, wherein a modulation frequency of the initialization signal is determined according to a modulation order; and
   the vibration causes an equivalent state exchange to occur between the qubit and the resonant cavity, so as to enable a transition from an excited state of the qubit to a ground state by using the resonant cavity.

2. The quantum circuit according to claim 1, wherein $$\Phi = A\cos(\omega t + \phi)$$

$\Phi$ represents the initialization signal, A represents a modulation amplitude of the initialization signal, $\omega$ represents a modulation frequency of the initialization signal, $\phi$ represents a modulation phase of the initialization signal, and t represents time.

3. The quantum circuit according to claim 1, wherein the feeder is a magnetic flux bias line.

4. The quantum circuit according to claim 1, wherein when an energy level of a sideband generated by the vibration and an energy level of the resonant cavity meet an approach condition, an equivalent state exchange occurs between the qubit and the resonant cavity.

5. The quantum circuit according to claim 1, wherein when a frequency difference between an operating point of the qubit and a sweet spot is less than or equal to a threshold, a modulation order of the initialization signal is an even number greater than or equal to 2, wherein the operating point of the qubit refers to a frequency of the qubit in an initialization state.

6. The quantum circuit according to claim 1, wherein when a frequency difference between an operating point of the qubit and a sweet spot is greater than a threshold, a modulation order of the initialization signal is an integer greater than or equal to 1, wherein the operating point of the qubit refers to a frequency of the qubit in an initialization state.

7. The quantum circuit according to claim 1, wherein $$\omega = \delta/N + \alpha$$

wherein $\omega$ represents the modulation frequency of the initialization signal, $\delta$ is a frequency difference between the qubit and the resonant cavity, N represents a modulation order of the initialization signal, and $\alpha$ is an allowable deviation range.

8. The quantum circuit according to claim 1, wherein the qubit is a frequency-adjustable superconducting qubit.

9. A quantum processor, comprising a quantum circuit, wherein:
the quantum circuit comprises: a qubit, a resonant cavity, and a feeder, the resonant cavity being coupled to the qubit, and the feeder being coupled to the qubit;
the feeder is configured to feed an initialization signal to the qubit, the initialization signal being a modulation signal used for causing a frequency of the qubit to generate a vibration, wherein a modulation frequency of the initialization signal is determined according to a modulation order; and
the vibration causes an equivalent state exchange to occur between the qubit and the resonant cavity, so as to enable a transition from an excited state of the qubit to a ground state by using the resonant cavity.

10. The quantum processor according to claim 9, wherein $$\Phi = A\cos(\omega t + \phi)$$

$\Phi$ represents the initialization signal, A represents a modulation amplitude of the initialization signal, $\omega$ represents a modulation frequency of the initialization signal, $\phi$ represents a modulation phase of the initialization signal, and t represents time.

11. The quantum processor according to claim 9, wherein the feeder is a magnetic flux bias line.

12. The quantum processor according to claim 9, wherein when an energy level of a sideband generated by the vibration and an energy level of the resonant cavity meet an approach condition, an equivalent state exchange occurs between the qubit and the resonant cavity.

13. The quantum processor according to claim 9, wherein when a frequency difference between an operating point of the qubit and a sweet spot is less than or equal to a threshold, a modulation order of the initialization signal is an even number greater than or equal to 2, wherein the operating point of the qubit refers to a frequency of the qubit in an initialization state.

14. The quantum processor according to claim 9, wherein when a frequency difference between an operating point of the qubit and a sweet spot is greater than a threshold, a modulation order of the initialization signal is an integer greater than or equal to 1, wherein the operating point of the qubit refers to a frequency of the qubit in an initialization state.

15. The quantum processor according to claim 9, wherein $$\omega = \delta/N + \alpha$$

wherein $\omega$ represents the modulation frequency of the initialization signal, $\delta$ is a frequency difference between the qubit and the resonant cavity, N represents a modulation order of the initialization signal, and $\alpha$ is an allowable deviation range.

16. The quantum processor according to claim 9, wherein the qubit is a frequency-adjustable superconducting qubit.

17. A method implemented by a quantum circuit, the quantum circuit comprising: a qubit, a resonant cavity, and a feeder, the resonant cavity being coupled to the qubit, and the feeder being coupled to the qubit, the method comprising:
feeding, by the feeder, an initialization signal to the qubit, the initialization signal being a modulation signal used for causing a frequency of the qubit to generate a vibration, wherein a modulation Frequency of the initialization signal is determined according to a modulation order; and
causing, by the vibration, an equivalent state exchange to occur between the qubit and the resonant cavity, so as to enable a transition from an excited state of the qubit to a ground state by using the resonant cavity.

18. The method according to claim 17, wherein $$\Phi = A\cos(\omega t + \phi)$$

$\Phi$ represents the initialization signal, A represents a modulation amplitude of the initialization signal, $\omega$ represents a modulation frequency of the initialization signal, $\phi$ represents a modulation phase of the initialization signal, and t represents time.

19. The method according to claim 17, wherein the feeder is a magnetic flux bias line.

20. The method according to claim 17, wherein the modulation frequency of the initialization signal is determined according to a frequency difference between the qubit and the resonant cavity, a modulation order of the initialization signal, and an allowable deviation range.

* * * * *